United States Patent
Ibasco

(10) Patent No.: US 10,311,411 B2
(45) Date of Patent: Jun. 4, 2019

(54) SYSTEM, METHOD AND COMPUTER PROGRAM ARRANGED TO FACILITATE A TRANSACTION

(71) Applicant: SMART HUB PTE. LTD., Singapore (SG)

(72) Inventor: Alex D. Ibasco, Paranaque (PH)

(73) Assignee: EINNOVATIONS HOLDINGS PTE. LTD., Singapore (SG)

( * ) Notice: Subject to any disclaimer, the term of this patent is extended or adjusted under 35 U.S.C. 154(b) by 648 days.

(21) Appl. No.: 14/370,744

(22) PCT Filed: Jan. 4, 2013

(86) PCT No.: PCT/SG2013/000006
§ 371 (c)(1),
(2) Date: Jul. 3, 2014

(87) PCT Pub. No.: WO2013/103323
PCT Pub. Date: Jul. 11, 2013

(65) Prior Publication Data
US 2014/0365361 A1     Dec. 11, 2014

(30) Foreign Application Priority Data
Jan. 6, 2012 (SG) .................... 201200108

(51) Int. Cl.
*G06Q 20/10* (2012.01)
*G06Q 20/02* (2012.01)
(Continued)

(52) U.S. Cl.
CPC ............. *G06Q 20/10* (2013.01); *G06Q 20/02* (2013.01); *G06Q 20/12* (2013.01); *G06Q 20/16* (2013.01);
(Continued)

(58) Field of Classification Search
USPC ....................................... 705/35–44
See application file for complete search history.

(56) References Cited

U.S. PATENT DOCUMENTS 6,330,560 B1 * 12/2001 Harrison ................. H04L 41/28
707/704
6,484,177 B1 * 11/2002 Van Huben ....... G06F 17/30589
(Continued)

FOREIGN PATENT DOCUMENTS

JP         04-058371        2/1992
JP         2002-312702      10/2002
(Continued)

OTHER PUBLICATIONS

Girishankar, Saroja. Sizzling Start-ups—10 E-Commerce Companies to Watch InternetWeek; Manhasset Iss. 751, (Feb. 8, 1999): p. 39.*

(Continued)

*Primary Examiner* — Hani M Kazimi
*Assistant Examiner* — Hatem M Ali
(74) *Attorney, Agent, or Firm* — Intellectual Property Law Group LLP

(57) ABSTRACT

A computing device for facilitating transactions between one or more remote devices, the device comprising a processing module arranged to interact with the one or more remote devices via a communications network and a database arranged to contain information regarding the state of one or more transaction channels in relation to an account, wherein the module is arranged to receive instructions via the communications network from the one or more remote devices and provide information regarding the state of the one or more transaction channels is disclosed.

15 Claims, 5 Drawing Sheets

(51) Int. Cl.
*G06Q 20/12* (2012.01)
*G06Q 20/16* (2012.01)
*G06Q 20/32* (2012.01)
*G06Q 20/34* (2012.01)
*G06Q 20/40* (2012.01)
*G06Q 30/06* (2012.01)

(52) U.S. Cl.
CPC ......... *G06Q 20/322* (2013.01); *G06Q 20/354* (2013.01); *G06Q 20/405* (2013.01); *G06Q 30/0601* (2013.01)

(56) References Cited

U.S. PATENT DOCUMENTS

| | | | |
|---|---|---|---|
| 7,383,988 | B2 | 6/2008 | Slonecker, Jr. |
| 2003/0034389 | A1* | 2/2003 | Cantini .............. G06Q 20/4033 235/380 |
| 2006/0282528 | A1* | 12/2006 | Madams ............... H04L 63/083 709/224 |
| 2007/0045403 | A1* | 3/2007 | Slonecker, Jr. ...... G06Q 20/354 235/380 |
| 2007/0100773 | A1* | 5/2007 | Wallach ............... G06Q 20/382 705/75 |
| 2007/0294388 | A1* | 12/2007 | Yu ...................... H04L 43/0817 709/224 |
| 2008/0021787 | A1* | 1/2008 | Mackouse .............. G06Q 20/10 705/17 |
| 2008/0189285 | A1* | 8/2008 | Rowley ................... H04L 63/10 |
| 2009/0077645 | A1* | 3/2009 | Kottahachchi .......... G06F 21/33 726/9 |
| 2010/0042846 | A1* | 2/2010 | Trotter .................... G06F 21/31 713/182 |
| 2010/0268815 | A1* | 10/2010 | Alonso Alarcon ......................... G06F 17/30359 709/224 |
| 2011/0055057 | A1* | 3/2011 | Vasten ............... G06Q 10/0837 705/30 |

FOREIGN PATENT DOCUMENTS

| | | |
|---|---|---|
| KR | 10-0687837 | 2/2007 |
| WO | WO 2010/147559 | 12/2010 |

OTHER PUBLICATIONS

Symoens, Jeff. Novell brings LDAP to NDS InfoWorld; San Mateo vol. 19, Iss. 4, (Jan. 27, 1997): 1, 123.*
Herman, James. Internet technologies to change network and system management Business Communications Review; Hinsdale vol. 27, Iss. 10, (Oct. 1997): 26-28.*
International Search Report, dated Mar. 18, 2013 for corresponding International Application No. PCT/SG2013/000006.
International Preliminary Report on Patentability, dated Mar. 26, 2014 for corresponding International Application No. PCT/SG2013/000006.

* cited by examiner

SYSTEM, METHOD AND COMPUTER PROGRAM ARRANGED TO FACILITATE A TRANSACTION

CROSS-REFERENCE TO RELATED APPLICATIONS

This application is a U.S. National Phase application, under 35 U.S.C. § 371, of International Application no. PCT/SG2013/000006, with an international filing date of Jan. 4, 2013, and claims benefit of Singapore Application no. 201200108-7 filed on Jan. 6, 2012, and which are hereby incorporated by reference for all purposes.

TECHNICAL FIELD

The present invention relates to a system, method and computer program arranged to facilitate a transaction. Embodiments of the invention find particular, but not exclusive, use in the field of electronic financial transactions, such as e-commerce, EDI (electronic data interchange), web-enabled and electronic point of sale transactions.

BACKGROUND ART

Nowadays, it is quite common to purchase goods and/or services over the Internet, through 'e-commerce' websites and web-enabled virtual stores. Correspondingly, there has been a need to develop electronic payment systems that facilitate the electronic transfer of value, while maintaining a high level of security.

One example of a transaction system and method which facilitates secure electronic transactions is described and defined in PCT application PCT/SG2010/000222 (publication number WO 2010/147559), which is incorporated herein by reference.

WO2010/147559 describes a system and method which allows a user or provider of a 'smart card' to change the state of a transaction channel. That is, the system and method allows a user or provider to 'lock' and/or 'unlock' certain transaction modes, such as web purchasing, point of sale purchasing, etc with respect to other transaction modes.

Such a system allows a user or provider to 'choose' what types of channels may be used to effect transactions. So, for example, a user may decide that, for security reasons, they will 'lock' their card to prevent the card from being used for web-based purchases, but will leave the card unlocked for traditional point of sale (POS) purchases. If the user's card is stolen, an unauthorized user would not be able to use the card to effect any web-based purchases, thereby providing an extra level of security.

In the abovementioned system, which is described herein below in more detail merely to provide some context for the inventive concept described in the specification as a whole, the card has a default setting, that 'locks' the card to prevent web-based purchases.

Thus, the card lock-unlock feature was developed with a view to provide a user with a mechanism to explicitly 'unlock' the card for web-based purchases. To save the user the effort of having to re-lock the channel after use, the channel may be automatically locked after a web purchase is made, or after a predefined period of time has passed (e.g. 30 minutes).

One commercially available embodiment provides a timer that is set immediately after the 'Unlock Card' transaction is processed. An incoming purchase transaction immediately re-locks the card and stops the timer. If the timer is not stopped and expires with no web purchase transaction seen, the system locks the card. This feature assists in mitigating web purchase fraud.

However, while the invention described and defined in WO2010/147559 provides a number of advantages over the prior art, there is a need to provide a more efficient method of locking/unlocking smart cards. In addition, there is also a need to avail card issuers with the locking/unlocking feature from a card network perspective.

The preceding discussion of the background art is intended to facilitate an understanding of the present invention only. The discussion is not an acknowledgement or admission that any of the material referred to is or was part of the common general knowledge as at the priority date of the application.

SUMMARY OF INVENTION

In accordance with a first aspect of the invention there is provided a computing device for facilitating transactions between one or more remote devices, comprising a processing module arranged to interact with the one, or more remote devices via a communications network and a database arranged to contain information regarding the state of one or more transaction channels in relation to an account, wherein the processing module is arranged to receive instructions via the communications network from the one or more remote devices and provide information regarding the state of the one or more transaction channels.

Preferably, the database utilises the Lightweight Directory Access Protocol (LDAP).

Preferably, the processing module is an intermediary stand-in host arranged to receive instructions from at least one card issuer. In one embodiment the at least one card issuer is a telecommunications operator.

Alternatively, the processing module is an intermediary stand-in host arranged to receive instructions from at least one card acquirer.

Preferably, the database is updated via the communications network on a periodic basis.

Preferably, the processing module is further operable to receive request to change the state of an at least one relatively unsecured transaction channel of the one or more transaction channels from a first state to a second state.

Preferably in the first state a subsequent transaction message identified with the relatively unsecured transaction channel will be refused and in the second state the transaction message will be passed on for further processing.

In accordance with a second aspect of the invention there is provided a system arranged to interact with the one or more remote devices via a communications network comprising a server including a database arranged to contain information regarding the state of one or more transaction channels in relation to an account, wherein the module is arranged to receive instructions via the communications network from the one or more remote devices and provide information regarding the state of the one or more transaction channels.

Preferably, the database utilises the Lightweight Directory Access Protocol (LDAP).

Preferably, the server is an intermediary stand-in host arranged to receive instructions from at least one card issuer. In one embodiment, the at least one card issuer is a telecommunications operator.

Preferably, the server is an intermediary stand-in host arranged to receive instructions from at least one card acquirer.

Preferably, the database is updated via the communications network on a periodic basis.

Preferably, the server is further operable to receive request to change the state of an at least one relatively unsecured transaction channel of the one or more transaction channels from a first state to a second state.

Preferably in the first state a subsequent transaction message identified with the relatively unsecured transaction channel will be refused and in the second state the transaction message will be passed on for further processing.

In accordance with a third aspect of the invention there is provided a method for facilitating transactions between one or more remote devices, comprising the steps of, receiving at a server a request to access information regarding the state of one or more transaction channels in relation to an account; and providing the information regarding the state of the one or more transaction channels to the one or more remote devices.

In accordance with a fourth aspect there is provided a computer program including at least one instruction capable of being executed by a computing system, which implements a method in the third aspect of the invention.

In accordance with a fifth aspect there is provided a computer readable medium including a computer program in accordance with the fourth aspect of the invention.

In a sixth aspect, there is provided a data signal including at least one instruction being capable of being received and interpreted by a computing system, wherein the one instruction implements a method in accordance with the third aspect of the invention.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Figure 1:
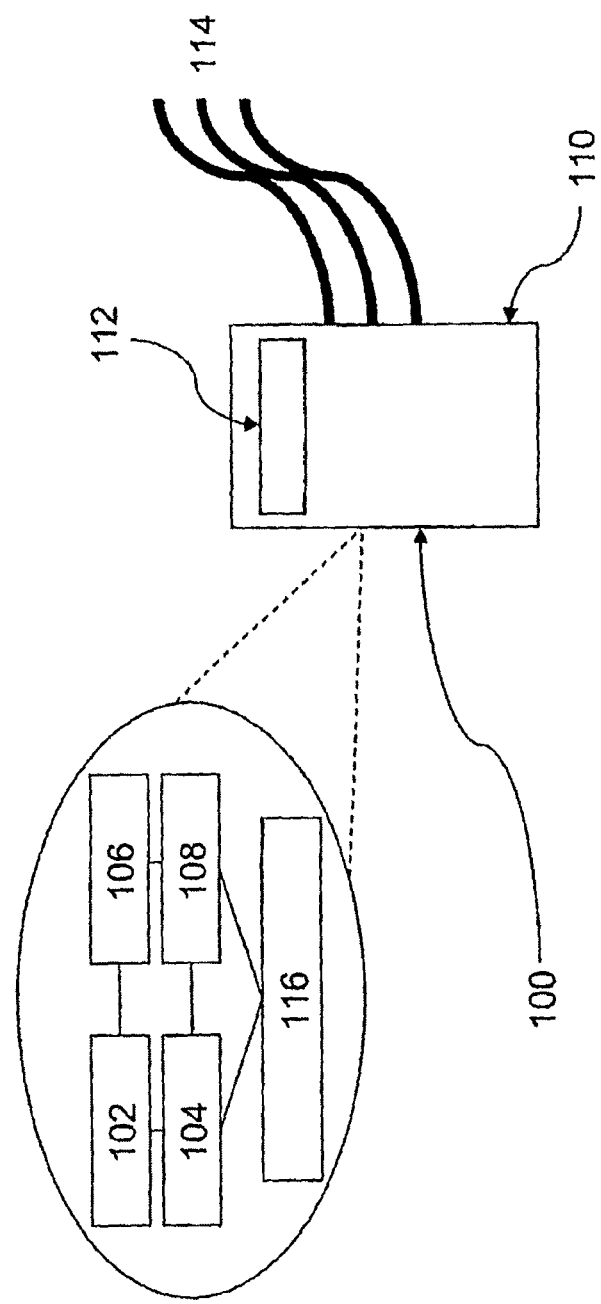
FIG. 1 is an example computing system which is capable of operating a system, method and/or computer program in accordance with an embodiment of the present invention.

Referring to FIG. 1, there is shown an example computing system which is capable of facilitating transactions in accordance with an embodiment of the present invention.

In FIG. 1 there is shown a schematic diagram of a computing system, which in this embodiment is a server 100 suitable for use with an embodiment of the present invention. The server 100 may be used to execute application and/or system services such as a system and method for facilitating an electronic financial transaction in accordance with an embodiment of the present invention.

With reference to FIG. 1, the server 100 may comprise suitable components necessary to receive, store and execute appropriate computer instructions. The components may include a processor 102, read only memory (ROM) 104, random access memory (RAM) 106, an input/output devices such as disc drives 108, input devices 110 (such as an Ethernet port, a USB port, etc.), display 112 such as a liquid crystal display, a light emitting display or any other suitable display and one or more communications link(s) 114.

The server 100 includes instructions that may be installed in ROM 104, RAM 106 or disc drives 108 and may be executed by the processor 102. There may be provided a plurality of communication links 114 which may variously connect to one or more computing devices such as servers, personal computers, terminals, wireless or handheld computing devices, or mobile communication devices such as a mobile (cell) telephone. At least one of a plurality of communications link may be connected to an external computing network through a telecommunications network.

In one particular embodiment the device may include a database which may reside on the input output storage device 108. It will be understood that the database may reside on any suitable storage device, which may encompass solid state drives, hard disc drives, optical drives or magnetic tape drives. The database may reside on a single physical storage device or may be spread across multiple storage devices.

The server 100 includes a suitable operating system 116 which may also reside on a storage device or in the ROM of the server 100. The operating system 116 is arranged to interact with the database and with one or more computer programs to cause the server to carry out the steps, functions and/or procedures in accordance with the embodiments of the invention described herein.

Figure 2:
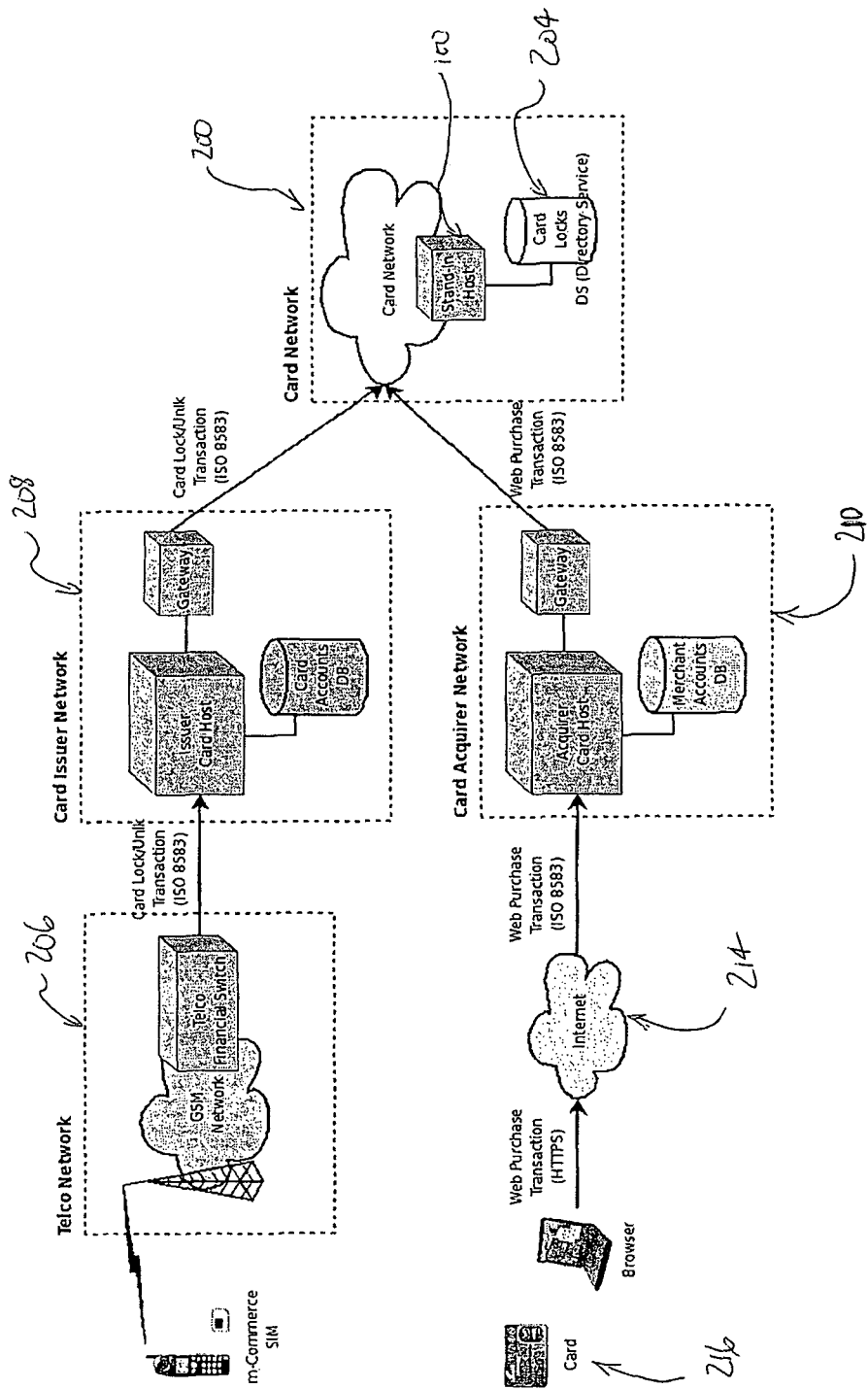
FIG. 2 is an example network incorporating a computing system in accordance with an embodiment of the present invention.

FIG. 2 provides a detailed view of an example of a card network (200) within a wider communications network 202, within which server 100 resides. Server 100 operates as a 'Stand-In' Host as will be described herein below.

The card network 200 comprises a database 204, which is labeled 'Card Locks Directory Service'. The Card Network is a network such as the MasterCard® or Visa® network, comprising links to relevant financial institutions and routes card transactions from Acquirer to Issuer.

In more detail, the Stand-In Host 100 operates as an intermediary server operated by a Card Network 200 which "stands in" for a Card issuer and serves to both maintain a collective 'Card Locks Table', which is accessible/controllable by the Card Issuers, and implement 'Card Lock-Unlock' functionality using the 'Card Locks Table' for reference. The Card Locks Directory Service 204 is a directory service that acts as a database and contains a single 'Card Locks Table'. The directory service 204 is preferably implemented using LDAP (Lightweight Directory Access Protocol) instead of a general RDBMS (Relational Database Management System).

The diagram of FIG. 2 further depicts the general operating environment in which embodiment of the invention operates. The components which make up the general operating environment include:

Telco Network 206—a network including one or more computing systems which routes m-commerce financial transactions from a computer device such as for example a mobile (cell) phone to the correct Card issuer network;

Card Issuer Network 208—a network including one or more computing systems which processes card transactions (such as 'Balance Inquiry' and 'Purchase'), which are forwarded by the Acquirer network via the Card Network;

Card Acquirer Network 210—a server which receives card transactions coming from different channels (POS Terminal, ATM Terminal, web) and forwards the transactions to respective Card issuers; and General Internet 214—a user interacts through a browser that links them to the Internet to effect a purchase. In purchasing over the Internet, the user will use their Smart Card (216). Smart Card 216 is at least capable of performing transactions such as (but not including) credit/debit functionalities similar to credit/debit cards.

The use and operation of the Internet, computers and servers using software applications and payment portals are well known to persons skilled vi the art and need not be described in any further detail herein except as is relevant to the present invention.

The card network 200 will be described in the context of a system that facilitates transactions via the locking/unlocking of smart card 216. The system is known as 'card-network enforced card Lock-Unlock' system.

Setting Up and Using the Stand-In Host Database

The "Card-Network enforced Card Lock-Unlock" system operates through the use of three processes or methodologies: Card Locks Provisioning, Card Locks Setup, and Card Locks Usage.

In the Card Locks Provisioning process, a record of the Card Account is created within the database (the Card Locks Directory Service) 204 in the Stand-In Host 100, so that a card issuer may interact with the Card Network and cause the card to be locked or unlocked. Once a record of the Card Account has been created in the Card Locks Directory Service 204, the Card Locks can be set up (i.e. the user's or Card Issuer's preferences can be loaded into the Card Locks Directory Service).

Thereafter, the user can connect to the Card Network (usually through the Card Issuer Network) to lock or unlock the card. The processes within each phase are described in more detail below with reference to FIGS. 3a to 3c.

Figure 3A:
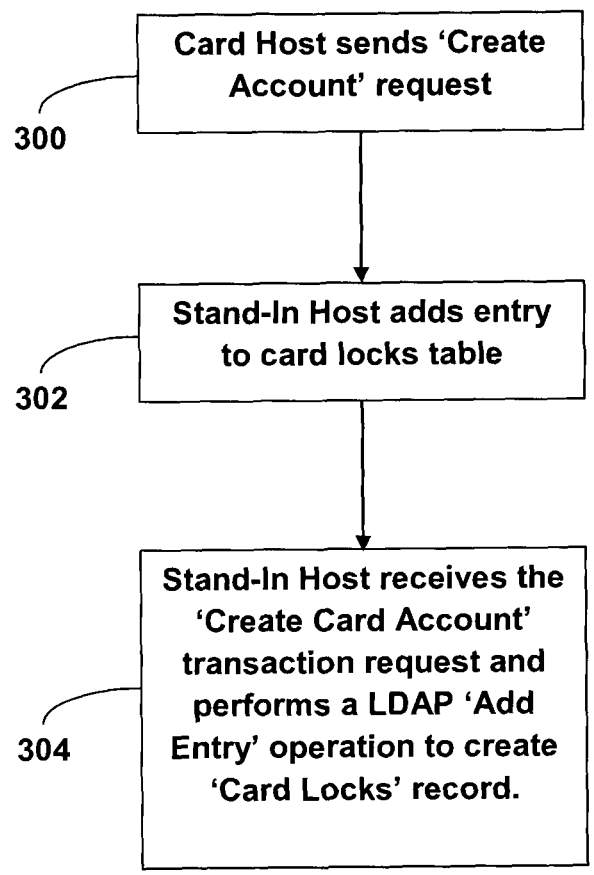
FIGS. 3a to 3c are flow charts depicting process flows in accordance with the method steps of an embodiment of the present invention.

Card Locks Provisioning—FIG. 3a

1. Provisioning begins with the issuer Card Host sending a 'Create Card Account' request to the Card Network (step 300). It will be understood that this step encompasses sending multiple 'Create Card Account' transactions (i.e. a 'batching' process) for efficiency. As an alternative to batch processing, single 'create card account' requests or transactions may also be sent for purpose of account creation errors to be addressed as it happens. Single 'create card account' requests are useful where network connections is/are unstable and in situations where the protocol used (example ISO 8583) is request-response based and therefore does not support batch file transfer. Single 'create card account' requests also allow account creation errors to be addressed as it happens.

2. Stand-In Host 100 adds the request entry in the directory service 'Card locks Table' (step 302).

3. The Card Network's Stand-In Host receives the 'Create Card Account' transaction request and performs a LDAP 'Add Entry' operation to create a 'Card Locks' record in the directory service 'Card locks Table' (step 304). For example, if the Card Issuer's default card locks setting is "Allow all transactions except 'ATM Withdrawal' and 'Web Purchase'" then the LDAP entry would be:

dn: 5577510998569107
txnLock: ATMWITHD, WEBPURCH where the 'dn' (Distinguished Name) is the Card No. and the custom attribute 'txnLock' lists the transactions, in a comma-delimited format, for which the card is locked.

Figure 3B:
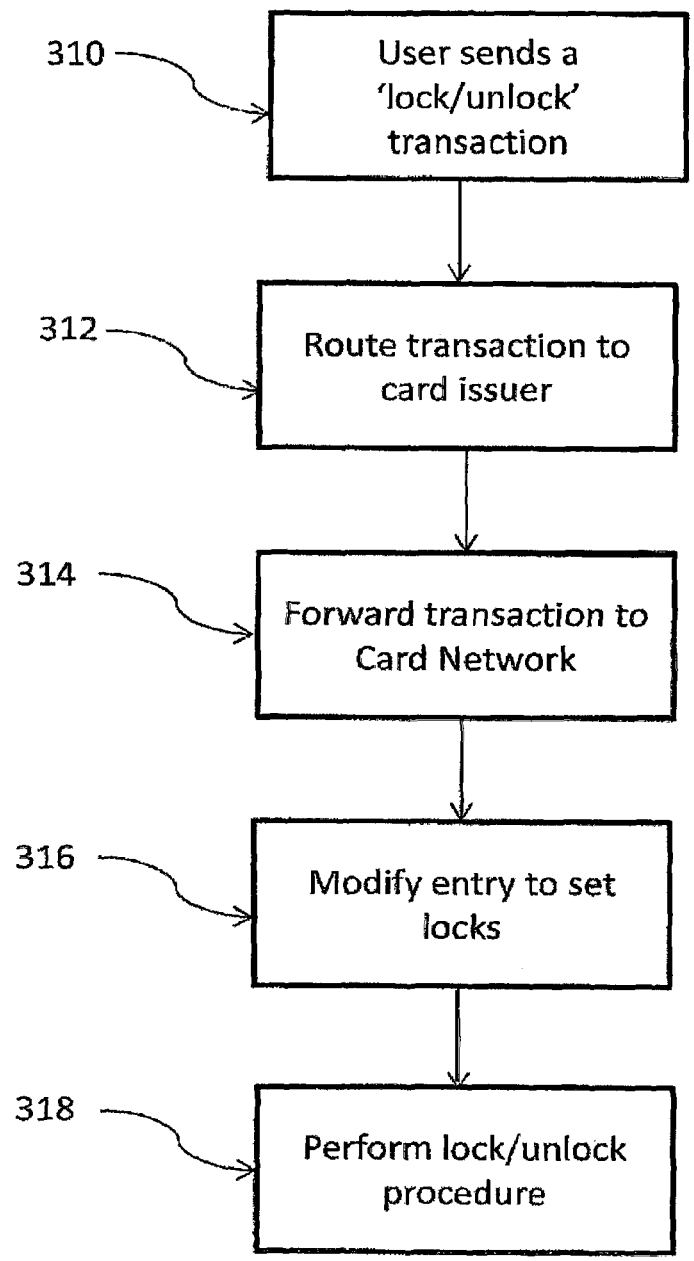

Card Locks Setup—FIG. 3b

1. Once the Stand-In Host has an entry for the account for a Cardholder, the Cardholder can use their m-commerce-enabled computer device such as a mobile (cell) phone to send a 'Card Lock/Unlock' transaction to the Stand-In Host (step 310).

2. The Telco Financial Switch routes the transaction to the correct Card issuer (step 312).

3. The Card issuer forwards the transaction to the Card Network (step 314). It will be understood that in the embodiment described herein, it is not necessary for the Card Issuer to track the Card Locks setting of each customer—these settings are maintained at the Card Network side.

4. The Card Network's Stand-In Host performs a LDAP "Modify Entry" operation to set the Cardholder's card locks accordingly (step 316). For example, if the Cardholder issued a 'Card Lock/Unlock' transaction which unlocked his card for all 'Web Purchase' transactions, the LDAP entry would be modified from:

dn: 5577510998569107
txnLock: ATIVIWITHD, WEBPURCH to only:

dn: 5577510998569107
txnLock: ATNIWITHD

5. Subsequently, the Stand-In Host performs a 'Card Lock/Unlock' procedure (detailed in PCT/SG2010/000222) (step 318). For example, the Stand-In Host creates a Timer that expires in for example, 15 minutes. Once the Timer expires, the 'Web Purchase' lock is restored in the LDAP entry via a LDAP 'Modify Entry' operation, if it has not already been restored (by the Stand-In Host in the event that a 'Web Purchase' transaction was received within the 15-minute window).

Figure 3C:
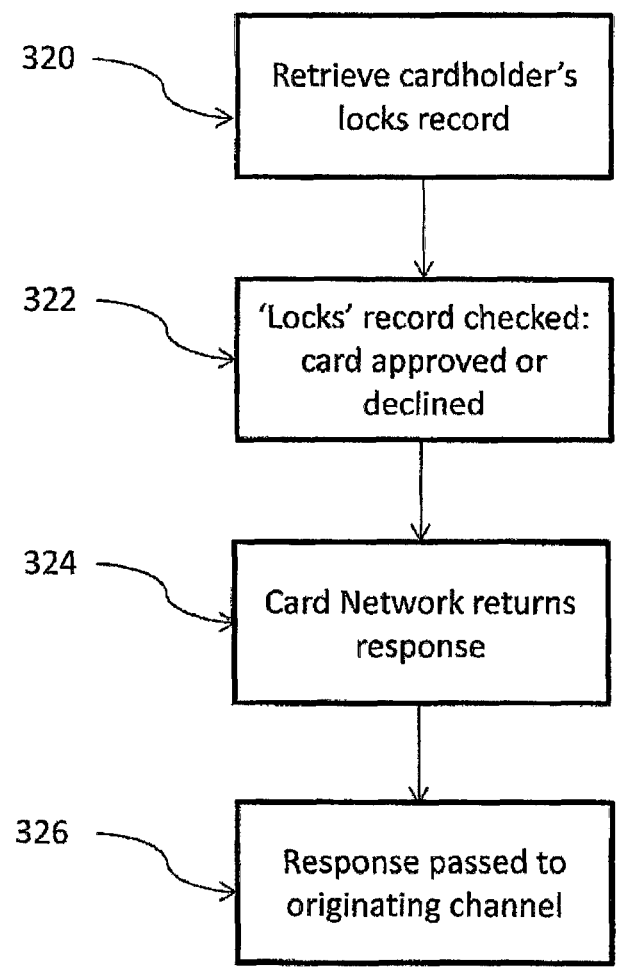

Card Locks Usage—FIG. 3c

Usage occurs either when the Cardholder issues a transaction such as a 'Web Purchase' transaction on their explicitly unlocked card, or when an unauthorized user issues a similar transaction on the locked card. In either case, the Card Acquirer receives the transaction from the Merchant, and forwards it to the Card Network.

1. The Card Networks Stand-In Host performs a LDAP 'Search Entry' request on the Card Locks Directory Service and retrieves the cardholder's locks record (step 320).

2. Subsequently, the Stand-In Host performs "Card lock-unlock" procedures (lock-unlock procedure detailed in PCT/SG2010/000222) (step 322). In more detail, the Stand-In Host checks the cardholders 'Card Locks' record. If the card is not locked for the particular transaction type, then the transaction is freely forwarded to the Card Issuer for processing. The Stand-In Host then restores the transaction lock in the Card Locks Directory Service (via a LDAP 'Modify Entry' operation), since the transaction has been performed. However, if the card is locked for the particular transaction type, then the Stand-In Host immediately declines the transaction, and does not forward the transaction to the Card issuer.

3. The Card Network returns the Approved or Declined response to the Card Acquirer (step 324).

4. The Card Acquirer passes on the response to the originating channel, which notifies the user on the result of his transaction (step 326).

Advantages

The 'Card-Network-enforced Card Lock-Unlock', provides a number of advantages over prior art systems. As the system operates from a central server (i.e. the Stand-In Host), there is no need for each card issuer to maintain a separate server for card lock-unlock data. Appropriate information can be sent to the Stand-In Host from all card issuers.

Correspondingly, as card issuers are not required to maintain individual Stand-In Hosts, more card issuers are likely to use the Stand-In Host, which in turn increases amenity to end users while allowing card issuers to offer the service to their clients without having to set up and maintain an intermediary (or additional) server. To provide the card network with a Stand-In Host assists in popularizing the service and establishing a de-facto standard worthy of a card industry-agreed ISO 8583 (or similar industry standard) response code for the 'Card is locked' condition (as explained below).

Importantly, the system provides a shorter transaction response time to card acquirers when the card is locked, since the card network need not forward certain transactions to the card issuer.

As mentioned above, the development of card network-enforced Stand-In Host allows for the development of a standard ISO 8583 response code for the 'Card is locked' condition. Currently, as implemented in one existing commercial embodiment of the prior art, when the card is locked and a web purchase transaction occurs, the card issuer's host blocks the transaction as expected. However, as there is no current industry standard for response codes related to card locks, the error notification message displayed by the merchant website is often vague, e.g., "Your card could not be authorized."

By providing the card network with the means to enforce the feature, the card network, which caters to hundreds of card issuers, is able to use the card lock-unlock feature across the entire network (i.e. to all card providers and users) thereby justifying the creation of a particular ISO 8583 response code for the 'Card is locked' condition.

Advantageously, utilizing a Stand-In Host allows a uniform 'card lock-unlock' service to be provided to all card issuer clients. If no industry-standard ISO 8583 response code for the 'Card is locked' condition is available, the card network could assign one code for use by all card issuers, assuring that all of its card acquirers would receive the same response code consistently when the condition occurs.

Once the response code is established, merchant websites would be able to provide much clearer error messages, such as "The transaction could not be processed because your card is locked. Please unlock your card and repeat the payment action."

Moreover, in one embodiment, the 'Card Locks Table' is implemented using a lightweight directory service (such as LDAP) instead of a relational database. Maintaining and operating the 'Card Locks Table' requires only a directory service with basic CRUD (Create, Read, Update, and Delete) operations. There are no SQL JOIN operations required since only one table is used. As such, information can be saved and retrieved very efficiently and quickly from the Stand-In Host, which ensures that there is no appreciable delay in a transaction being authorized or declined, and also in a card being locked or un-locked. In other words, the Stand-In Host is almost completely transparent to the Card Issuer, the Card Acquirer and the user (customer).

Moreover, as all 'decline' responses are recorded in a central location, it is possible to form a bird's-eye view of which card issuer has the most number of "Card is locked" decline responses. This collection of data is useful to security specialists looking for trends in web purchase fraud.

VARIATIONS AND MODIFICATIONS

Although not required, the embodiments described with reference to the figures can be implemented via an application programming interface (API) or as a series of libraries, for use by a developer, and can be included within another software application, such as a terminal or personal computer operating system or a portable computing device operating system, or within a transaction processing system.

Generally, as program modules include routines, programs, objects, components and data files that perform or assist in the performance of particular functions, it will be understood that the functionality of the software application may be distributed across a number of routines, programs, objects or components to achieve the same functionality as the embodiment and the broader invention claimed herein. Such variations and modifications are within the purview of those skilled in the art.

It will also be appreciated that where methods and systems of the present invention and/or embodiments are implemented by computing systems or partly implemented by computing systems then any appropriate computing system architecture may be utilized. This includes standalone computers, network computers and dedicated computing devices (such as hardware-based arrays).

Where the terms "computer", "computing system" and "computing device" are used in the specification, these terms are intended to cover any appropriate arrangement of computer hardware for implementing the inventive concept and/or embodiments described herein.

The invention claimed is:

1. A computing device for facilitating transactions with at least one remote device, comprising:
   a processing module arranged to interact with the at least one remote device via a communications network, the processing module comprises an intermediary stand-in host for a plurality of card issuers; and
   a database arranged to utilize Lightweight Directory Access Protocol (LDAP) and contain LDAP entry as an information regarding each state of a plurality of transaction channels in relation to a card account,
   wherein when the at least one remote device sends a transaction to change a state of at least one transaction channel from among the plurality of transaction channels, a card issuer is operable to forward the transaction to the processing module without tracking the state of the at least one transaction channel, and the processing module is operable to receive the transaction from the card issuer, modify the LDAP entry regarding the state of the at least one transaction channel from among the plurality of transaction channels based on the transaction and create a timer that expires in a predetermined period,
   wherein once the timer expires, the processing module is further operable to modify the LDAP entry regarding the state of the at least one transaction channel, in order to restore the state of the at least one transaction channel.

2. The computing device in accordance with claim 1, wherein the processing module is arranged to receive instructions from the plurality of card issuers.

3. The computing device in accordance with claim 2, wherein at least one card issuer is a telecommunications operator.

4. The computing device in accordance with claim 1, wherein the processing module is arranged to receive instructions from at least one card acquirer.

5. The computing device in accordance with claim 1, wherein the database is updated via the communications network on a periodic basis.

6. The computing device according to claim 2, wherein the processing module is further operable to receive request to change a state of an at least one relatively unsecured transaction channel of the plurality of transaction channels from a first state to a second state.

7. A system arranged to interact with at least one remote device via a communications network comprising:
   a server including a database arranged to utilize Lightweight Directory Access Protocol (LDAP) and contain LDAP entry as an information regarding each state of a plurality of transaction channels in relation to a card account, the server comprises an intermediary stand-in host for a plurality of card issuers,
   wherein when the at least one remote device sends a transaction to change a state of at least one transaction channel from among the plurality of transaction channels, a card issuer is operable to forward the transaction to the server without tracking the state of the at least one transaction channel, and the server is operable to receive the transaction from the card issuer, modify the LDAP entry regarding the state of the at least one transaction channel from among the plurality of transaction channels based on the transaction and create a timer that expires in a predetermined period,
   wherein once the timer expires, the server is further operable to modify the LDAP entry regarding the state of the at least one transaction channel, in order to restore the state of the at least one transaction channel.

8. The system in accordance with claim 7, wherein the server is arranged to receive instructions from the plurality of card issuers.

9. The system in accordance with claim 8, wherein at least one card issuer is a telecommunications operator.

10. The system in accordance with claim 7, wherein the server is arranged to receive instructions from at least one card acquirer.

11. The system in accordance with claim 7, wherein the database is updated via the communications network on a periodic basis.

12. The system in accordance with claim 8, wherein the server is further operable to receive request to change a state of the at least one relatively unsecured transaction channel of the plurality of transaction channels from a first state to a second state.

13. A method for facilitating transactions with at least one remote device, comprising the steps of:
   sending, by the at least one remote device, a transaction to change a state of at least one transaction channel from among a plurality of transaction channels;
   forwarding, by a card issuer, the transaction to a server without tracking the state of the at least one transaction channel;
   receiving at the server the transaction from the card issuer, wherein the server is an intermediary stand-in host for a plurality of card issuers, and the server includes a database utilizing Lightweight Directory Access Protocol (LDAP) and containing LDAP entry as an information regarding each state of the plurality of transaction channels in relation to a card account;
   modifying, by the server, the LDAP entry regarding the state of the at least one transaction channel from among the plurality of transaction channels based on the transaction;
   creating, by the server, a timer that expires in a predetermined period; and
   once the timer expires, modifying, by the server, the LDAP entry regarding the state of the at least one transaction channel, in order to restore the state of the at least one transaction channel.

14. A computer program, including at least one instruction capable of being executed by a computing system, which implements the method in accordance with claim 13.

15. A non-transitory computer readable medium including the computer program in accordance with claim 14.

\* \* \* \* \*